United States Patent
Chu et al.

(10) Patent No.: US 8,179,647 B2
(45) Date of Patent: May 15, 2012

(54) ESD POWER CLAMP FOR HIGH-VOLTAGE APPLICATIONS

(75) Inventors: Fang-Tsun Chu, Dali (TW); Kuo-Ji Chen, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 45 days.

(21) Appl. No.: 12/897,585

(22) Filed: Oct. 4, 2010

(65) Prior Publication Data
US 2012/0081820 A1 Apr. 5, 2012

(51) Int. Cl.
*H02H 9/00* (2006.01)
*H01C 7/12* (2006.01)
*H02H 1/00* (2006.01)
*H02H 1/04* (2006.01)
*H02H 3/22* (2006.01)
*H02H 9/06* (2006.01)

(52) U.S. Cl. .......................... 361/56; 361/118
(58) Field of Classification Search .............. 361/56
See application file for complete search history.

(56) References Cited

U.S. PATENT DOCUMENTS

| | | | |
|---|---|---|---|
| 5,610,791 A | 3/1997 | Voldman | |
| 5,956,219 A | 9/1999 | Maloney | |
| 6,954,098 B2 | 10/2005 | Hsu et al. | |
| 7,397,642 B2 * | 7/2008 | Ker et al. | 361/56 |
| 8,059,376 B2 * | 11/2011 | Chen et al. | 361/56 |
| 2002/0027755 A1 * | 3/2002 | Andresen et al. | 361/56 |
| 2007/0183104 A1 * | 8/2007 | Tseng | 361/56 |
| 2011/0194218 A1 | 8/2011 | Chen et al. | |
| 2011/0195744 A1 * | 8/2011 | Zhang | 455/550.1 |

* cited by examiner

*Primary Examiner* — Dharti Patel
(74) *Attorney, Agent, or Firm* — Slater & Matsil, L.L.P.

(57) ABSTRACT

An ESD clamp includes a first power supply node; an ESD detection circuit coupled to the first power supply node and configured to detect an ESD event; and a bias circuit coupled to the first power supply node and configured to output a second power supply voltage to a second power supply node. The second power supply voltage is lower than a first power supply voltage on the first power supply node. The ESD detection circuit is configured to activate the bias circuit to change working state in response to the ESD event. The ESD clamp further includes an LV ESD clamp coupled to the second power supply node, wherein the LV ESD clamp includes LV devices with maximum endurable voltages lower than the first power supply voltage.

16 Claims, 4 Drawing Sheets

ESD POWER CLAMP FOR HIGH-VOLTAGE APPLICATIONS

BACKGROUND

Electrostatic discharge (ESD) is a known problem in the manufacturing and the using of integrated circuits. Typically, transistors have thin oxides and insulating layers that can be damaged by the electrostatic discharge, and special care is required to protect the integrated circuits from the damage caused by the ESD.

In high-voltage (HV) applications such as applications using light-emitting devices (LED) and liquid crystal display (LCD) devices, ESD protection circuits are also needed. The ESD protection circuits may include ESD power clamps coupled between HV power nodes and electrical grounds. Conventional ESD power clamps may be implemented using RC-HVMOS transistors or cascaded bipolar-junction transistors (BJT), which are electrically broken down by ESD transients to conduct ESD currents. However, the conventional ESD power clamps suffer from drawbacks. For example, the RC-HVMOS devices require large chip areas. The BJTs in the power clamps have non-flexible design window, and the trigger voltage for the ESD protection is limited by the number of cascaded BJTs.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

A novel high-voltage (HV) electrostatic discharge (ESD) power clamp is provided in accordance with an embodiment. The variations and the operation of the embodiment are discussed. Throughout the various views and illustrative embodiments, like reference numbers are used to designate like elements.

Figure 1:
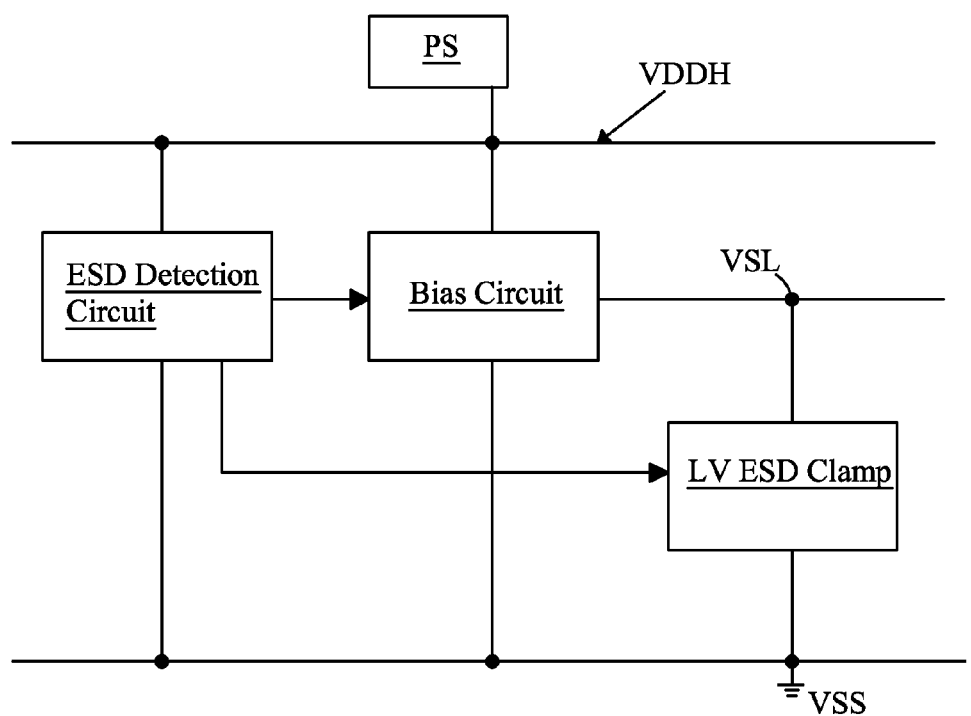
FIG. 1 illustrates a circuit diagram of a high-voltage (HV) electrostatic discharge (ESD) power clamp in accordance with an embodiment.

FIG. 1 illustrates a block diagram of an HV ESD power clamp in accordance with an embodiment. The HV ESD power clamp is coupled between power supply nodes VDDH and VSS. In an embodiment, the VSS node is the electrical ground. Power supply node VDDH may carry a first positive power supply voltage, which is also denoted as VDDH. Power source PS comprises an output coupled to power supply node VDDH, which provides an HV power supply voltage (also denoted as VDDH). In an exemplary embodiment, the HV power supply voltage VDDH is greater than about 10V, or greater than about 20V, although different voltages may be used.

The HV ESD power clamp includes an ESD detection circuit, a bias circuit, and a low-voltage (LV) ESD clamp. The ESD detection circuit is configured to detect ESD events occurring between, and including, HV power supply node VDDH and node VSS, and activates the LV ESD clamp to bypass the ESD currents. The bias circuit comprises HV devices, and is used to provide a bias supply voltage (referred to as LV power supply voltage VSL hereinafter) to LV ESD devices in the LV ESD clamp during normal operation, during which no ESD events occur. The working state of the bias circuit is changed by the ESD detection circuit. The LV ESD clamp is turned off when no ESD events occur, and is turned on to conduct ESD currents during the ESD events.

Figure 2:
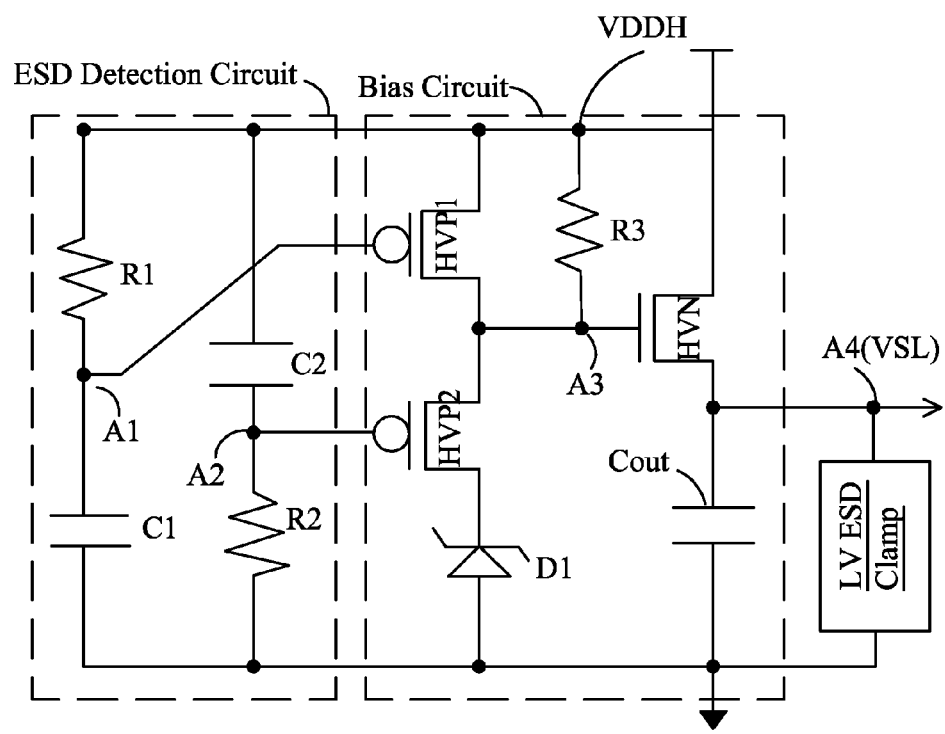
FIG. 2 illustrates the circuit diagram of an exemplary HV ESD power clamp.

FIG. 2 illustrates an exemplary implementation of the HV ESD power clamp. The ESD detection circuit may include resistor R1 and capacitor C1 coupled between HV power supply node VDDH and node VSS, and resistor R2 and capacitor C2 coupled between HV power supply node VDDH and node VSS.

The bias circuit may include HV PMOS transistors HVP1 and HVP2 having their source-to-drain paths coupled in series, and serially coupled to diode D1. The gates of HV PMOS transistors HVP1 and HVP2 may have their gates coupled to nodes A1 and A2 respectively, with node A1 being between resistor R1 and capacitor C1, and node A2 between resistor R2 and capacitor C2. The bias circuit may receive input signals at the gates of HV PMOS transistors HVP1 and HVP2, and outputs LV power supply voltage VSL at node A4. Further, the bias circuit may include resistor R3 and HV NMOS transistor HVN, wherein the gate of HV NMOS transistor HVN is coupled to the node between source-to-drain paths of HV PMOS transistor HVP1 and HVP2, and the source of HV NMOS transistor HVN is coupled to capacitor Cout, which is further coupled to node VSS. Further, the LV ESD clamp is coupled between source A4 of HV NMOS transistor HVN and node VSS.

Figure 3:
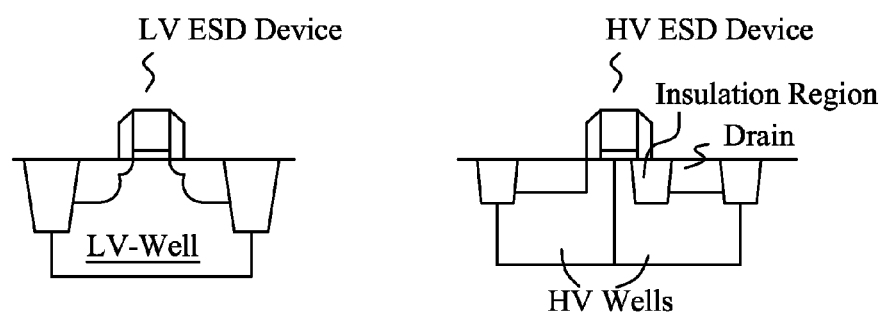
FIG. 3 illustrates cross-sectional views of exemplary LV ESD devices and HV transistors.
Figure 4:
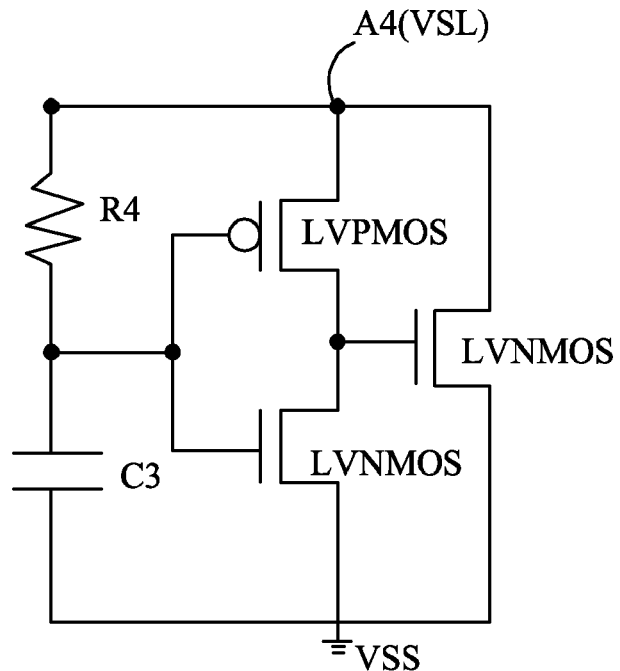
FIGS. 4 and 5 illustrate the circuit diagrams of exemplary LV ESD power clamps.
Figure 5:
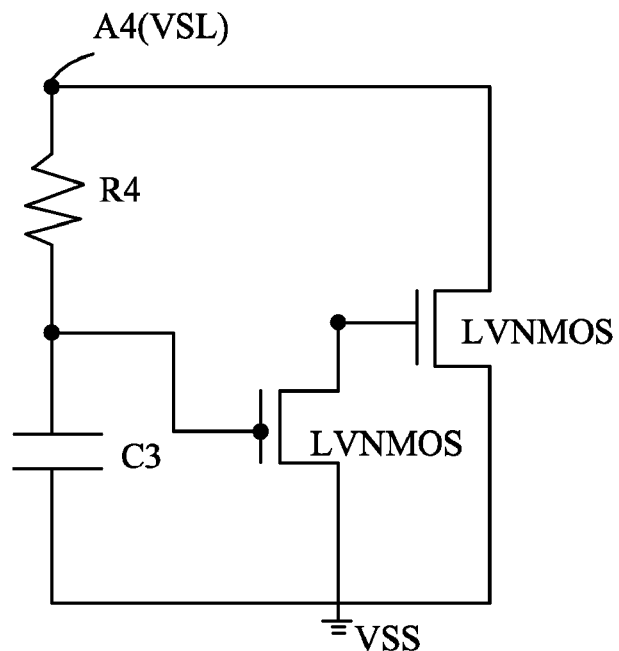

FIGS. 4 and 5 illustrate exemplary LV ESD clamp embodiments, which includes LV ESD devices LVNMOS and LVPMOS. In an exemplary embodiment, voltage VSL on node A4, which voltage is outputted by the bias circuit, is lower than HV power supply voltage VDDH (FIGS. 1 and 2). In an embodiment, LV power supply voltage VSL is lower than about 50 percent, or even lower than about 20 percent, HV power supply voltage VDDH. It is noted that LV ESD devices LVNMOS and LVPMOS have different designs than that of HV devices HVP1, HVP2, and HVN in FIG. 2. For example, FIG. 3 illustrates the cross-sectional view of an exemplary LV ESD device and an exemplary HV ESD device. LV ESD devices LVNMOS and LVPMOS may be formed in LV well regions, while HV ESD devices HVP1, HVP2, and HVN may be formed in HV well regions, with the impurity concentration of the LV well regions being higher than the impurity concentrations of the HV well regions. Further, HV ESD devices HVP1, HVP2, and HVN (FIGS. 2 and 3) may include insulation regions between the respective drain regions and the gate electrodes, while LV ESD devices LVNMOS and LVPMOS do not include the insulation regions between the respective drain regions and the gate electrodes.

The LV ESD devices such as LVNMOS and LVPMOS are designed to sustain voltages lower than HV power supply voltage VDDH. In other words, the maximum allowable gate-to-drain voltages and gate-to-source voltages (referred to as maximum endurable voltages) of LV ESD devices LVNMOS and LVPMOS are lower than power supply voltage VDDH. During the operation of the respective chip, the gate-to-drain voltages and gate-to-source voltages applied to the LV ESD devices/transistors in the LV ESD clamp need to be no higher than the respective maximum endurable voltages. Otherwise, the LV ESD devices may be damaged and the gate oxides of these transistors may be broken down. The maximum endurable voltages may be lower than about 50 percent, or even lower than about 30 percent, of power supply voltage VDDH. On the other hand, the maximum endurable voltages of LV ESD devices are greater than LV power supply voltage VSL on node A4 in FIGS. 2 and 3.

The operation of the HV ESD power clamp is briefly discussed as follows referring to FIG. 2. During a normal operation, in which no ESD events occur, in the ESD detection circuit, node A1 is at a high voltage, while node A2 is at a low voltage. HV PMOS transistor HVP1 is thus turned off, while HV PMOS transistor HVP2 is turned on. Accordingly, resistor R3, HV PMOS transistor HVP2, and diode D1 in combination provide a bias voltage to node A3, which is also the gate of HV NMOS transistor HVN. The LV power supply voltage VSL is thus outputted to node A4. In an exemplary embodiment, HV power supply voltage VDDH is greater than about 10V, while LV power supply voltage VSL is about 5V. With the LV power supply voltage VSL applied on the LV ESD clamp, the LV ESD clamp is not turned on.

During an ESD event, assuming an ESD transient occurs on HV power supply node VDDH, node A1 is at a low voltage since capacitor C1 is equivalent to be shorted, while node A2 is at a high voltage since capacitor C2 is equivalent to be shorted. HV PMOS transistor HVP1 is accordingly turned on, and HV PMOS transistor HVP2 is turned off. The gate of HV NMOS transistor HVN is at a high voltage, and hence HV NMOS transistor HVN is turned on. The ESD current is thus conducted from HV power supply node VDDH to node A4 through HV NMOS transistor HVN. As a result, the internal ESD detection circuit (not shown in FIG. 2, please refer to resistor R4 and capacitor C3 in FIGS. 4 and 5) in the LV ESD clamp will turn on the LV ESD devices LVNMOS and LVPMOS, and the ESD current is conducted to node VSS.

Experimental and simulation results have shown that the bias circuit may reliably output stable LV supply voltage VSL even if HV power supply voltage VDDH changes. In the experiment and simulation results, when HV power supply voltage VDDH increases from about 6V to about 40V, LV supply voltage VSL stays steadily at about 5V. Accordingly, the design window of the embodiments is large. The HV ESD power clamps in accordance with embodiments also have good ESD protection ability. Experimental results also revealed that if ESD transients occur from HV power supply node VDDH to node VSS, the HV ESD power clamp may sustain higher ESD discharge current and has shown better human body mode (HBM) and machine mode (MM) ESD level than the conventional HV ESD clamp.

In accordance with embodiments, an ESD clamp includes a first power supply node; an ESD detection circuit coupled to the first power supply node and configured to detect an ESD event; and a bias circuit coupled to the first power supply node and configured to output a second power supply voltage to a second power supply node. The second power supply voltage is lower than a first power supply voltage on the first power supply node. The ESD detection circuit is configured to activate the bias circuit to change working state in response to the ESD event. The ESD clamp further includes an LV ESD clamp coupled to the second power supply node, wherein the LV ESD clamp includes LV devices with maximum endurable voltages lower than the first power supply voltage.

In accordance with other embodiments, an ESD clamp includes a first power supply node; an electrical ground; an ESD detection circuit coupled between the first power supply node and the electrical ground, wherein the ESD detection circuit is configured to detect an ESD transient on nodes of the ESD clamp; and a bias circuit coupled between the first power supply node and the electrical ground. The bias circuit is configured to receive a signal from the ESD detection circuit, and output a voltage in response to the signal, with the voltage being applied to a second power supply node, wherein the bias circuit comprises HV devices. The ESD clamp further includes an LV ESD clamp including a first end coupled to the second power supply node, and a second end coupled to the electrical ground, wherein the LV ESD clamp includes LV devices with maximum endurable voltages lower than maximum endurable voltages of the HV devices.

In accordance with yet other embodiments, an ESD clamp includes a power supply node; an electrical ground; an ESD detection circuit, and a bias circuit. The ESD detection circuit includes a first resistor coupled between the power supply node and the electrical ground; a first capacitor coupled between the first resistor and the electrical ground; a second capacitor coupled between the power supply node and the electrical ground; and a second resistor coupled between the second capacitor and the electrical ground. The bias circuit includes a first input coupled to a node between the first resistor and the first capacitor; a second input coupled to a node between the second resistor and the second capacitor; and an output. The ESD clamp further includes an LV ESD clamp coupled between the output of the bias circuit and the electrical ground.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An electrostatic discharge (ESD) clamp comprising:
a first power supply node;
an ESD detection circuit coupled to the first power supply node and configured to detect an ESD event;
a bias circuit coupled to the first power supply node and configured to output a second power supply voltage to a second power supply node, with the second power supply voltage being lower than a first power supply voltage on the first power supply node, wherein the ESD detection circuit is configured to activate the bias circuit to change working state in response to the ESD event; and
a low-voltage (LV) ESD clamp coupled to the second power supply node, wherein the LV ESD clamp comprises LV devices with maximum endurable voltages lower than the first power supply voltage.

2. The ESD clamp of claim 1 further comprising a VSS node, wherein each of the ESD detection circuit and the bias circuit is coupled between the first power supply node and the VSS node, and wherein the LV ESD clamp is coupled between the second power supply node and the VSS node.

3. The ESD clamp of claim 1, wherein the ESD detection circuit comprises:
a first resistor coupled between the first power supply node and a VSS node;
a first capacitor coupled between the first resistor and the VSS node;
a second capacitor coupled between the first power supply node and the VSS node; and
a second resistor coupled between the second capacitor and the VSS node.

4. The ESD clamp of claim 3, wherein the bias circuit comprises:
a first PMOS transistor comprising a gate coupled to a node between the first resistor and the first capacitor;
a second PMOS transistor comprising a gate coupled to a node between the second resistor and the second capacitor, wherein source-to-drain paths of the first and the second PMOS transistors are coupled in series; and
a diode coupled in series with the source-to-drain paths of the first and the second PMOS transistors.

5. The ESD clamp of claim 4 further comprising:
an NMOS transistor comprising a drain coupled to the first power supply node, a gate coupled to a node between the source-to-drain paths of the first and the second PMOS transistors, and a source coupled to the second power supply node;
a third resistor coupled between the first power supply node and the gate of the NMOS transistor; and
a third capacitor coupled between the second power supply node and the VSS node.

6. An electrostatic discharge (ESD) clamp comprising:
a first power supply node;
an ESD detection circuit coupled between the first power supply node and an electrical ground, wherein the ESD detection circuit is configured to detect an ESD transient on nodes of the ESD clamp;
a bias circuit coupled between the first power supply node and the electrical ground, wherein the bias circuit is configured to receive a signal from the ESD detection circuit, and output a voltage in response to the signal, with the voltage being applied to a second power supply node, and wherein the bias circuit comprises high-voltage (HV) devices; and
a low-voltage (LV) ESD clamp comprising a first end coupled to the second power supply node, and a second end coupled to the electrical ground, wherein the LV ESD clamp comprises LV devices with maximum endurable voltages lower than maximum endurable voltages of the HV devices.

7. The ESD clamp of claim 6, wherein the voltage outputted by the bias circuit is lower than a voltage on the first power supply node, and wherein the bias circuit is configured to keep the voltage substantially stable in response to a change in the voltage on the first power supply node with no ESD transient occurring on any node of the ESD clamp.

8. The ESD clamp of claim 6, wherein the maximum endurable voltages of the LV devices in the LV ESD clamp are lower than the voltage on the first power supply node.

9. The ESD clamp of claim 6, wherein the ESD detection circuit comprises:
a first resistor coupled between the first power supply node and the electrical ground;
a first capacitor coupled between the first resistor and the electrical ground;
a second capacitor coupled between the first power supply node and the electrical ground; and
a second resistor coupled between the second capacitor and the electrical ground.

10. The ESD clamp of claim 9, wherein the bias circuit comprises:
a first PMOS transistor comprising a gate coupled to a node between the first resistor and the first capacitor;
a second PMOS transistor comprising a gate coupled to a node between the second resistor and the second capacitor, wherein source-to-drain paths of the first and the second PMOS transistors are coupled in series; and
a diode coupled in series with the source-to-drain paths of the first and the second PMOS transistors.

11. The ESD clamp of claim 10 further comprising:
an NMOS transistor comprising a drain coupled to the first power supply node, a gate coupled to a node between the source-to-drain paths of the first and the second PMOS transistors, and a source coupled to the second power supply node;
a third resistor coupled between the first power supply node and the gate of the NMOS transistor; and
a third capacitor coupled between the second power supply node and the electrical ground.

12. An electrostatic discharge (ESD) clamp comprising:
a power supply node;
an electrical ground;
an ESD detection circuit comprising:
a first resistor coupled between the power supply node and the electrical ground;
a first capacitor coupled between the first resistor and the electrical ground;
a second capacitor coupled between the power supply node and the electrical ground; and
a second resistor coupled between the second capacitor and the electrical ground;
a bias circuit comprising:
a first input coupled to a node between the first resistor and the first capacitor;
a second input coupled to a node between the second resistor and the second capacitor; and
an output; and
a low-voltage (LV) ESD clamp coupled between the output of the bias circuit and the electrical ground.

13. The ESD clamp of claim 12, wherein the LV ESD clamp comprises LV devices with maximum endurable voltages lower than a voltage on the power supply node.

14. The ESD clamp of claim 12, wherein the bias circuit comprises:
a first PMOS transistor comprising a gate coupled the first input of the bias circuit;
a second PMOS transistor comprising a gate coupled to the second input of the bias circuit, wherein source-to-drain paths of the first and the second PMOS transistors are coupled in series;
a diode coupled in series with the source-to-drain paths of the first and the second PMOS transistors; and
an NMOS transistor comprising a drain coupled to the power supply node, a gate coupled to drains of the first and the second PMOS transistors, and a source coupled to the output of the bias circuit.

15. The ESD clamp of claim 14, wherein the bias circuit further comprises:
a third resistor coupled between the power supply node and the gate of the NMOS transistor; and
a third capacitor coupled between the output of the bias circuit and the electrical ground.

16. The ESD clamp of claim 14, wherein the first and the second PMOS transistors and the NMOS transistor are high-voltage transistors.

\* \* \* \* \*